United States Patent [19]
Takeoka

[11] Patent Number: 4,695,985
[45] Date of Patent: Sep. 22, 1987

[54] APPARATUS FOR PREVENTING A ROUNDABOUT OF SUPERSONIC WAVE IN A SUPERSONIC WAVE TRANSMITTER AND RECEIVER FOR A VEHICLE

[75] Inventor: Seiei Takeoka, Yokohama, Japan

[73] Assignee: Niles Parts Co., Ltd, Omorinishi, Japan

[21] Appl. No.: 840,748

[22] Filed: Mar. 18, 1986

[30] Foreign Application Priority Data

Nov. 26, 1985 [JP] Japan .......................... 60-182013[U]

[51] Int. Cl.⁴ .......................... G01S 9/66; H04R 1/02

[52] U.S. Cl. .......................... 367/87; 367/99; 367/140

[58] Field of Search .......................... 367/87, 99, 140

[56] References Cited

U.S. PATENT DOCUMENTS

| | | | |
|---|---|---|---|
| 3,296,586 | 1/1967 | Midlock et al. | 340/15 |
| 4,155,066 | 5/1979 | Galvin et al. | 367/140 |
| 4,463,453 | 7/1984 | Cohen et al. | 367/135 |

FOREIGN PATENT DOCUMENTS

| | | | |
|---|---|---|---|
| 52-9335 | 2/1977 | Japan . | |
| 0021953 | 2/1978 | Japan | 367/140 |
| 0218295 | 12/1983 | Japan | 367/140 |
| 59-36680 | 3/1984 | Japan . | |

*Primary Examiner*—Stephen C. Buczinski
*Assistant Examiner*—Melissa L. Koltak
*Attorney, Agent, or Firm*—Vorys, Sater, Seymour and Pease

[57] ABSTRACT

A cylindrical member for preventing a roundabout of the supersonic wave is arranged around the transmitting and receiving opening of one of the sender or receiver of a supersonic wave device for a vehicle which is installed on the vehicle. Thereby the phenomenon of the roundabout of the supersonic wave is reduced and at the same time the duration time of phenomenon of the roundabout of the supersonic wave is decreased and the object of the short distance can be sensed.

15 Claims, 8 Drawing Figures

APPARATUS FOR PREVENTING A ROUNDABOUT OF SUPERSONIC WAVE IN A SUPERSONIC WAVE TRANSMITTER AND RECEIVER FOR A VEHICLE

BACKGROUND OF THE INVENTION

1. Field of the Invention

This invention relates to a supersonic wave device for a vehicle with which a vehicle height in respect to a road surface and the like is detected by use of a reflected wave of a supersonic wave sensor installed in the vehicle. More particularly, this invention relates to an apparatus for preventing a roundabout of a supersonic wave in which the supersonic wave transmitted from a transmitter in the supersonic wave transmitter and receiver of the vehicle is directly received by the receiver without being reflected by the object.

2. Description of the Prior Art

Hitherto, there are developed various supersonic wave sensors in which a distance to an object and the presence or non-presence of the object are detected by the reflected wave of the supersonic wave sensor. In the vehicle itself, various supersonic wave sensors have been developed as the performance of the vehicle has been improved. In particular, there is a supersonic wave sensor for a road surface to be used in a so-called supersonic wave suspension, such as a vehicle retracting sensor, for sensing the obstacles at the rear part of the vehicle or a so-called backsoner, for example, in which a variation in vehicle height is measured in response to a condition of the road surface such as a bad road during running of the vehicle. A dampening force of the shock absorber is properly controlled to improve a comfortable feeling and stability in steering.

FIG. 8 shows a side elevational view for illustrating the conventional type of the supersonic wave sensor.

As shown in FIG. 8, a sender is provided for transmitting a supersonic wave to a receiver 2 for receiving a supersonic wave sent from the sender 1.

An insulator 3 protects the sender 1 and the receiver 2 and is made of foamed rubber and the like.

A base plate 4 is provided for mounting circuit elements 5 which are protected by a filler agent 6. A reference numeral 7 denotes a case.

In the case 7 is formed an inverted cone shaped horn 8 at the front surface of the sender 1 and the receiver 2. In the surface to which the horn part 8 is opened is held a heater 9 by a bracket 10.

In this type of conventional system having the above-described components, the supersonic wave transmitted from the sender 1 reaches the receive 2 through a diffraction and a side lobe and the like as a direct wave in the air. As another passage for the supersonic wave, it is transmitted through a clearance formed between the case 7 and the heater 9 and an assembly of the bracket 10.

A phenomenon in which the supersonic wave is transmitted directly from the sender 1 to the receiver 2 is defined as a so-called roundabout phenomenon of the supersonic wave. In order to prevent an erroneous operation of the system caused by this roundabout phenomenon, for example, as shown in FIGS. 6 and 7, it was necessary to provide a procedure for electrically inhibiting a sensing of the received signal caused by the roundabout of the supersonic wave under an operation of the circuit during a desired time T1 (m sec) from a time $t_0$ (m sec) of transmitting the supersonic wave. A characteristic (i) shown in FIG. 6 indicates a charcteristic of the received signal caused by the roundabout of the supersonic wave, and a characteristic (j) indicates a characteristic of the received signal caused by a reflected wave from the sensed objects of the supersonic wave sensor, for example, the road surface and the like. FIG. 7 shows a characteristic of a timing pulse for use in energizing the sender 1. Therefore, if the continuing time of the roundabout characteristic (i) of the supersonic wave is extended, it is necessary to set a long prohibiting time T1 (m sec). In other words, the object placed at a short distance where a reaching time of the reflected wave to the receiver 2 is short cannot be sensed. This feature is a fatal disadvantage in the supersonic wave road surface sensor for use in sensing the road surface placed at a short distance from the vehicle.

That is, in the supersonic wave sensor for use in sensing a short distance object such as a supersonic wave road surface sensor, it has been the final subject to shorten the duration time of a roundabout phenomenon of the supersonic wave or to reduce the roundabout phenomenon of the supersonic wave.

SUMMARY OF THE INVENTION

The present inventor has tried various products to counter the above-described problems, and proved that the duration time of the roundabout phenomenon of the supersonic wave could be shortened with an arrangement of foamed rubber or urethane material and the like in a cylindrical form at the opening of the sender or receiver.

The present invention has been established in view of the above-described points, and in one aspect is an apparatus for preventing a roundabout of the supersonic wave in a supersonic wave transmitter and receiver for a vehicle characterized in that a cylindrical member for preventing roundabout of the supersonic wave is arranged at the opening of the sender or receiver of the supersonic wave transmitting and receiving device for use in transmitting the supersonic wave and receiving the reflected wave.

The member for preventing a roundabout of the supersonic wave may reduce the supersonic wave diffracted from the sender to the receiver or the side lobe of the supersonic wave and the like, resulting a reduction of the duration time of the roundabout phenomenon of the supersonic wave and decrease the roundabout phenomenon of the supersonic wave itself.

It is an object of the present invention to reduce the roundabout of the supersonic wave from the sender to the receiver or the side lobe and the like in the receiver for use in transmitting the supersonic wave signal from the sender of the supersonic wave transmitting and receiving device and receiving the reflected wave.

It is another object of the present invention to decresae the roundabout phenomenon of the supersonic wave from the sender to the receiver.

It is still another object of the present invention to shorten the duration time of the roundabout phenomenon of the supersonic wave from the sender to the receiver.

It is a still further object of the present invention to decrease a level of the received signal of the supersonic wave caused by the roundabout of the supersonic wave.

It is a still further object of the present invention to improve a directivity of the supersonic wave transmitted from the supersonic wave receiver device.

It is a still further object of the present invention to enable a sensing of the short distance object using the supersonic wave receiver device.

DESCRIPTION OF THE PREFERRED EMBODIMENTS

First Embodiment

Figure 1:
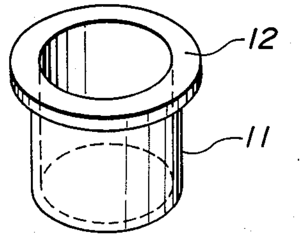
FIG. 1 is a perspective view for showing a first preferred embodiment of a cylinder member for preventing a roundabout of the supersonic wave.

FIG. 1 is a perspective view for showing a first preferred embodiment of the cylindrical member for preventing a roundabout of the supersonic wave made in accordance with the present invention.

In FIG. 1, the cylindrical member 11 for preventing the roundabout of the supersonic wave is made such that rubber or foamed rubber and the like are formed in a cylindrical shape, for example, and a flange part 12 is provided at its one end.

Figure 2:
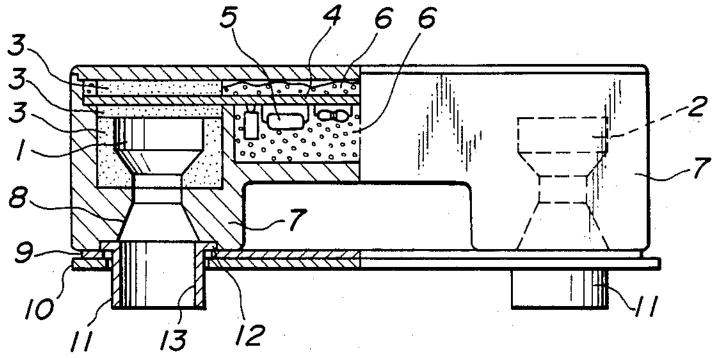
FIG. 2 is a side elevational view for showing a system in which the cylinder member for preventing the roundabout of the supersonic wave shown in FIG. 1 is installed in the supersonic wave receiving device.
Figure 3:
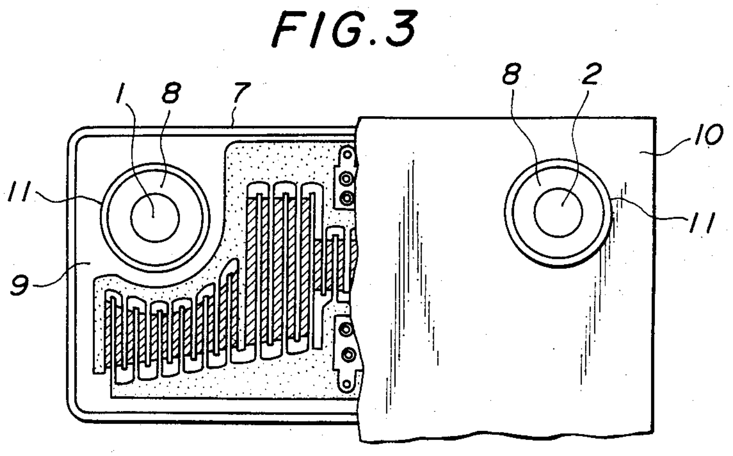
FIG. 3 is a front elevational view for showing the preferred embodiment indicated in FIG. 2.

FIGS. 2 and 3 are a side elevational view and a front elevational view for showing a system in which the cylindrical member 11 for preventing the roundabout of the supersonic wave is installed in the supersonic wave transmitting and receiving device.

Figure 8:
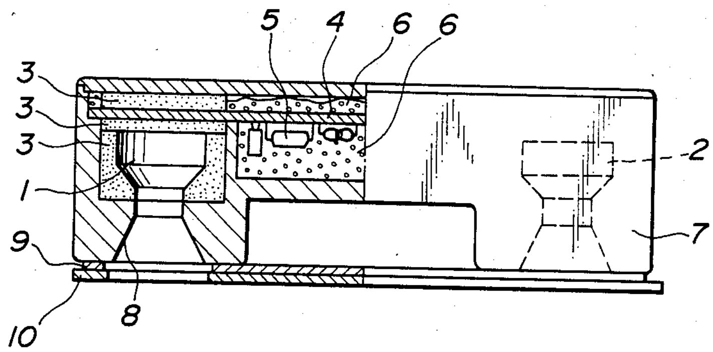
FIG. 8 is a side elevational view for showing a preferred embodiment of the prior art.

The same numerals for showing the prior art in FIGS. 2 and 3 as that of FIG. 8 indicate the same construction and so their description will be eliminated.

The cylindrical member 11 for preventing the roundabout of the supersonic wave is fixed to the opening of the sender 1 and the receiver 2 by a method wherein its flange 12 is held by the case 7 for the supersonic wave transmitting and receiving device and the heater 9 or the bracket 10.

The cylindrical member for preventing the roundabout of the supersonic wave 11 is formed by rubber or foamed rubber and the like as described above, and its flange 12 is held by the case 7 of the supersonic wave transmitting and receiving device and the heater 9 or the bracket 10. Thereby, a clearance formed between these members is eliminated by the flange 12 so as to prevent the roundabout of the supersonic wave is eliminated. With this construction, the directivity of the supersonic wave is improved by the cylindrical part of the member 11 for preventing the roundabout of the supersonic wave and the roundabout of the supersonic wave caused by the diffraction or sidelobe is reduced.

If the surface of the inner wall 13 of the member 11 for preventing the roundabout of the supersonic wave is rough, its sidelobe is further decreased.

Second Embodiment

Figure 4:
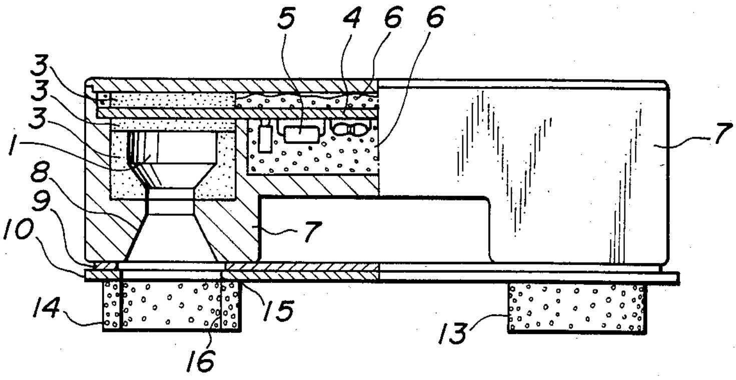
FIG. 4 is a side elevational view for showing a second preferred embodiment of a cylindrical member for preventing a roundabout of the supersonic wave constructed in accordance with the present invention.

FIG. 4 is a side elevational view for showing a second preferred embodiment of the cylindrical member for preventing the roundabout of the supersonic wave made in accordance with the present invention.

The same reference numerals in FIG. 4 as used in connection with FIGS. 2, 3 and 8 indicate the same construction and so their description will be eliminated.

The second preferred embodiment shown in FIG. 4 is made such that the cylindrical member for preventing the roundabout of the supersonic wave is formed by foamed rubber or urethane resin and the like and adhered to the opening of the sender 1 and the receiver 2 of the supersonic wave transmitting and receiving device with dual adhesive tape or an adhesive member 15 such as an adhesive agent and the like.

The sidelobe is absorbed by an irregular surface of the inner wall 16 of the cylindrical member 14 for preventing the roundabout of the supersonic wave, its directivity is improved and the roundabout of the supersonic wave is reduced.

Figure 5:
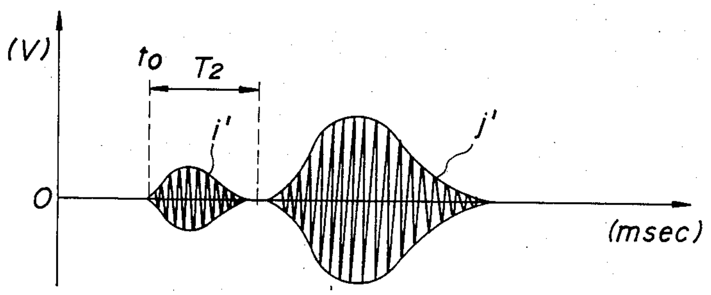
FIG. 5 is a diagram for showing an electrical characteristic of a received supersonic wave signal of the receiver made in accordance with the preferred embodiment of the present invention.
Figure 6:
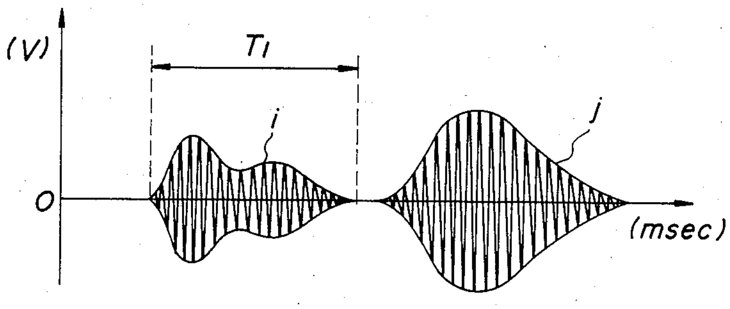
FIG. 6 is a view for showing an electrical characteristic of the received supersonic wave signal made in accordance with the prior art.
Figure 7:
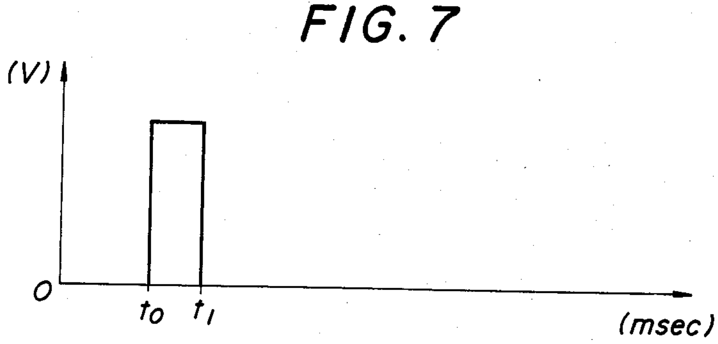
FIG. 7 is a view for showing an electrical characteristic of a timing pulse characteristic for use in energizing the sender constructed in accordance with the prior art.

As described above, in the present invention, since the roundabout of the supersonic wave is reduced by the cylindrical members 11 and 14 for preventing the roundabout of the supersonic wave, the duration time of the characteristic (i') of the received signal caused by the roundabout of the supersonic wave as shown in FIG. 5 is reduced and the level of the received signal is also decreased.

Therefore, it becomes possible to set a prohibiting time T2 (m sec) to a short duration and so it becomes possible to sense the object of the short distance between the vehicle body and the road surface.

As described above, the present invention is made such that the cylindrical member for preventing the roundabout of the supersonic wave is installed at the opening of the sender or receiver of the supersonic wave transmitting and receiving device so as to prevent the roundabout of the supersonic wave and this invention is not limited to the above-described preferred embodiments.

Therefore, the member for preventing the roundabout of the supersonic wave may be one in which it may be installed only at the opening of either the sender or receiver of the supersonic wave transmitting and receiving device. Its material quality and shape are such that it may prevent the roundabout of the supersonic wave, for example, one in which the resin pipe is formed as a bellows form or, a carbon fiber, glass fiber or steel fiber is formed into a cylindrical shape, and a sectional shape of the cylindrical part may be formed as a round or other polygonal shapes.

As described above in detail, the present invention can provide that the phenomenon of roundabout of the supersonic wave from the sender to the receiver is reduced under the above-described construction and so the duration time of the characteristic of the received signal caused by the roundabout of the supersonic wave, and further its level can also be reduced.

Due to this fact, the present invention has some effects that the object of the short distance can be sensed and may provide the device for preventing the roundabout of the supersonic wave which is preferable for the supersonic wave road surface sensor and the like.

What is claimed is:

1. An apparatus for preventing a roundabout of a supersonic wave in a supersonic wave transmitting and receiving device having a supersonic wave sender and a supersonic wave receiver for a vehicle in which a vehicle height and the like with respect to a road surface is sensed by a reflected wave of the supersonic wave device, said sensor and said receiver each having a horn which opens outwardly to wave-passing openings in said device, said apparatus being characterized in that a cylindrical member for preventing the roundabout of the supersonic wave between said sender and said receiver is arranged on said device at one of said wave-passing openings in said device and in communication with said horn connecting said wave-passing opening with at least one of the sender or the receiver of the supersonic wave transmitting and receiving device for use in transmitting the supersonic wave signal and receiving the reflected supersonic wave from and to said device.

2. An apparatus as set forth in claim 1 in which said cylindrical member for preventing the roundabout of the supersonic wave is formed from at least one of a group consisting of rubber, foamed rubber, urethane resin, carbon fiber, glass fiber, and steel fiber, and the like.

3. An apparatus as set forth in either claim 1 or 2 in which a sectional shape of said cylindrical member for preventing the roundabout of the supersonic wave is one of a circle or a polygonal shape.

4. An apparatus as set forth in any one of claims 1 or 2 in which said cylindrical member for preventing the roundabout of the supersonic wave is formed such that an inner wall surface of said cylindrical member has an irregular shape.

5. An apparatus as set forth in any one of claims 1 or 2 in which said cylindrical member for preventing the roundabout of the supersonic wave has a flange portion at one end of said cylindrical member, said flange portion being located within a wall of said device so that at least a portion of said cylindrical portion extends outwardly from said device.

6. An apparatus as set forth in claim 3 in which said cylindrical member for preventing the roundabout of the supersonic wave is formed such that an inner wall surface of said cylindrical member has an irregular shape.

7. An apparatus as set forth in claim 3 in which said cylindrical member for preventing the roundabout of the supersonic wave has a flange part at its one end, said flange portion being located within a wall of said device so that at least a portion of said cylindrical member extends outwardly from said device.

8. An apparatus as set forth in claim 4 in which said cylindrical member for preventing the roundabout of the supersonic wave has a flange part at its one end, said flange portion being located within a wall of said device so that at least a portion of said cylindrical member extends outwardly from said device.

9. An apparatus as set forth in claim 6 in which said cylindrical member for preventing the roundabout of the supersonic wave has a flange part at its one end, said flange portion being located within a wall of said device so that at least a portion of said cylindrical member extends outwardly from said device.

10. An apparatus for preventing a roundabout of a supersonic wave in a supersonic wave transmitting and receiving device for a vehicle for sensing vehicle height relative to a surface by a reflected supersonic wave, comprising;

a housing for securing a supersonic wave sender and receiver within said housing, and including a horn at the front surface of said sender, said horn opening outwardly from said housing to permit transmission of said supersonic wave through wave-passing opening in said housing;

a closed, elongated member for preventing the roundabout of said supersonic wave located in said wave-passing opening so that a portion thereof is secured to said housing so that an elongated opening defined by said member extends in the direction of transmission or reception of said supersonic wave, said elongated member acting to seal said wave-passing opening in said housing and said horn against spurious wave transmission.

11. The apparatus as set forth in claim 10 wherein said housing includes a heater secured by a bracket at the surface of said housing toward which said horn is opened to permit passage of said supersonic wave by transmission through a clearance opening formed between the housing, the heater, and the bracket, said member extending to close a clearance opening formed thereby against spurious transmission of said supersonic waves.

12. The apparatus as set forth in claim 11 wherein said member is a cylindrical member having a flange portion at one end thereof, said flange portion being located within said housing so that a cylindrical portion extending therefrom seals said clearance opening.

13. The apparatus as set forth in claim 12 wherein said cylindrical member is formed by foamed rubber.

14. The apparatus as set forth in claim 10 wherein said member is secured to said casing by adhesive means.

15. The apparatus as set forth in claim 10 wherein said member has an irregular surface on an inner wall thereof.

* * * * *